(12) United States Patent
Yanagi

(10) Patent No.: US 10,197,162 B2
(45) Date of Patent: Feb. 5, 2019

(54) GASKET

(71) Applicant: NOK Corporation, Tokyo (JP)

(72) Inventor: Tokunori Yanagi, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/125,488

(22) PCT Filed: Mar. 13, 2015

(86) PCT No.: PCT/JP2015/057512
§ 371 (c)(1),
(2) Date: Sep. 12, 2016

(87) PCT Pub. No.: WO2015/137491
PCT Pub. Date: Sep. 17, 2015

(65) Prior Publication Data
US 2017/0089465 A1 Mar. 30, 2017

(30) Foreign Application Priority Data

Mar. 14, 2014 (JP) .................................. 2014-051581

(51) Int. Cl.
F16J 15/10 (2006.01)
F16J 15/12 (2006.01)

(52) U.S. Cl.
CPC ........... F16J 15/125 (2013.01); F16J 15/104 (2013.01)

(58) Field of Classification Search
CPC ...... F16J 15/125; F16J 15/104; F16J 15/3204; F16J 15/3232; F16J 15/3236; F16L 23/20
(Continued)

(56) References Cited

U.S. PATENT DOCUMENTS 3,158,376 A * 11/1964 Rentschler ........... F16J 15/3232
277/436
3,635,480 A * 1/1972 Bain ....................... F16J 15/123
277/651

(Continued)

FOREIGN PATENT DOCUMENTS

JP 1261564 10/1989
JP 06032834 * 9/1992

(Continued)

Primary Examiner — Nathan Cumar
(74) Attorney, Agent, or Firm — K. David Crockett, Esq.; Niky Economy Syrengelas, Esq.; Crockett & Crockett, PC

(57) ABSTRACT

An object of the present invention is to provide a gasket capable of ensuring an excellent sealing property by a pair of seal beads oriented in directions axially opposing to each other, regardless of an inserting direction of the gasket into a setting groove. The object is achieved by a gasket in which: an axial length of a reinforcement ring (11) is formed to have a length such that the other axial end of the reinforcement ring (11) approaches an end surface of the other mating member or an end surface of a setting groove (21) in a state that one axial end of the reinforcement ring (11) contacts the end surface of the setting groove or the end surface of the other mating member; one axial end of the reinforcement ring (11) projects from an outer peripheral portion of a first seal bead (122), and the first seal bead (122) has rigidity lower than rigidity of a second seal bead (123); and the second seal bead (123) is formed with interference relative to the end surface of the other mating member or the end surface of the setting groove in a state that one axial end of the reinforcement ring (11) contacts the end surface of the setting groove or the end surface of the other mating member.

8 Claims, 3 Drawing Sheets

(58) Field of Classification Search
USPC ....... 277/651, 309, 349–353, 402, 628, 637, 277/639; 285/1, 100, 277, 70
See application file for complete search history.

(56) References Cited

U.S. PATENT DOCUMENTS

| | | | | |
|---|---|---|---|---|
| 4,258,927 | A | * | 3/1981 | Cather, Jr. ........... F16J 15/3268 277/309 |
| 4,298,203 | A | * | 11/1981 | Holzer ................. F16J 15/3252 277/560 |
| 4,469,336 | A | * | 9/1984 | Linne ................. B29C 45/1657 277/402 |

FOREIGN PATENT DOCUMENTS

| JP | 632834 | | 4/1994 |
|---|---|---|---|
| JP | 2012-067790 | * | 4/2012 |

* cited by examiner (Prior Art)

GASKET

FIELD OF THE INVENTIONS

The present invention relates to a gasket, more specifically, the gasket in which a gasket body integrally molded with a reinforcement ring is provided with two seal beads that project in directions axially opposing to each other.

BACKGROUND OF THE INVENTIONS

As a gasket used as a sealing means at a connecting portion or the like of a case, there is a known gasket integrally including a pair of seal beads positioned at both axial ends of a gasket body and oriented to an inner peripheral side in directions axially opposing to each other (Patent Document 1).

The inventor of the present application proposes a structure illustrated in FIG. 5 as the gasket integrally including such a pair of seal beads.

This gasket 100 has a structure in which a gasket body 102 formed of a rubber-like elastic material (rubber material or synthetic resin material having rubber-like elasticity) is integrally molded with a metallic reinforcement ring 101. The gasket body 102 is integrally molded with a pair of seal beads 102a, 102b positioned at both axial ends thereof and oriented to an inner peripheral side in directions axially opposing to each other. The seal beads 102a, 102b are formed so as to have almost same shape and substantially same rigidity.

The gasket 100 is disposed inside a setting groove 201 formed at an opening edge portion of one member 200 constituting a sealing target space S. Further, clearance δ between the members 200 and 300 is sealed when the gasket 100 is axially compressed between an end surface 201a of the setting groove 201 and an end surface 300a of the other member 300.

Here, while the gasket 100 is set, the axial compression force applied to the gasket 100 acts as force F that causes the seal beads 102a, 102b of the gasket 100 to fall toward the inner peripheral side. On the other hand, fluid pressure P inside the sealing target space S acts as force that causes the seal beads 102a, 102b to closely contact the end surfaces 300a and 201a when inner peripheral surfaces of the seal beads 102a, 102b receive the fluid pressure P. By this, the gasket 100 exerts a self-sealing function by the seal beads 102a, 102b, and seals the clearance δ between the members 200 and 300.

However, in the case where the fluid pressure P inside the sealing target space S is high, the gasket 100 sometimes makes movement as illustrated in FIG. 6 in which its setting position inside the setting groove 201 is axially displaced to one of the seal beads (seal bead 102a in FIG. 6) having lower rigidity because of a slight rigidity difference between the two seal beads 102a, 102b. In this case, the seal bead having reduced interference (seal bead 102b in FIG. 6) is largely deformed toward an outer peripheral side by the fluid pressure P in a manner protruding toward the clearance δ, and fluids inside the sealing target space S may leak out as indicated by a dotted arrow.

Further, when the fluid pressure is repeatedly turned on and off, the seal beads 102a, 102b may be abraded as a result of a fact that the gasket 100 repeats axial displacement to one side and recovery movement to an original position with a large stroke inside the setting groove 201.

On the other hand, there is another gasket disclosed in Patent Document 2 in which a gasket body is integrally molded with a reinforcement ring and a pair of lip portions positioned at both axial ends is formed to have different thicknesses respectively.

This gasket is disposed such that the reinforcement ring is eccentrically located on one axial end side, and an inserting direction of the gasket into a setting groove is specified such that the reinforcement ring is disposed at a position to block a clearance between mating members. Further, the thickness of one of the lip portions disposed on the reinforcement ring side is formed thinner than the thickness of the other lip portion, thereby more largely deforming the thinner lip portion disposed on the reinforcement ring side when the gasket is axially compressed inside the setting groove. By this, the gasket is axially positioned such that the reinforcement ring constantly blocks the clearance, and protrusion of the lip portion toward the clearance can be surely prevented by the reinforcement ring.

PRIOR ART DOCUMENTS

Patent Documents

Patent Document 1: JP-A-1-261564
Patent Document 2: JP-U-A-6-32834

SUMMARY

Problem to be Solved by the Invention

Patent Document 2 is excellent in that the axial position of the gasket inside the setting groove can be specified even when the fluid pressure is repeatedly turned on and off. However, there is a new problem in that the inserting direction into the setting groove is limited.

Therefore, the present invention is directed to providing a gasket capable of ensuring an excellent sealing property by a pair of seal beads oriented in directions axially opposing to each other, regardless of an inserting direction of the gasket into a setting groove.

Other objects of the present invention will be apparent from the following description.

Means for Solving Problem

The above-described problems are solved by the following respective inventions.

1. A gasket having a gasket body integrally molded with a reinforcement ring, the gasket body including first and second seal beads positioned at one axial end and the other axial end of the reinforcement ring and oriented to an inner peripheral side in directions axially opposing to each other, and wherein an axial length of the reinforcement ring is formed to have a length such that the other axial end of the reinforcement ring approaches the end surface of the other mating member or the end surface of the setting groove in a state that one axial end of the reinforcement ring contacts the end surface of the setting groove or the end surface of the other mating member, one axial end of the reinforcement ring projects from an outer peripheral portion of the first seal bead, the first seal bead has rigidity lower than rigidity of the second seal bead, and the second seal bead is formed with interference relative to the end surface of the other mating member or the end surface of the setting groove in a state that one axial end of the reinforcement ring contacts the end surface of the setting groove or the end surface of the other mating member.

The gasket according to 1, wherein when the gasket is not set in the setting groove yet, a projection amount of the second seal bead toward an inner peripheral side of the reinforcement ring and a projection amount from the reinforcement ring in the directions axially opposing to each other are formed larger than each projection amount of the first seal bead.

The gasket according to 1 or 2, wherein a deformation amount of the first seal bead is larger than a deformation amount of the second seal bead when the gasket body receives axial compression force.

The gasket according to 1, 2, or 3, wherein an outer peripheral bead closely contacting an inner peripheral surface of the setting groove is formed on an outer peripheral surface of the gasket body.

The gasket according to 4, wherein the outer peripheral bead is formed on the outer peripheral surface of the gasket body in the vicinity of the other axial end of the reinforcement ring.

The gasket according to any one of 1 to 5, wherein the first seal bead has a round-shaped tip.

The gasket according to any one of 1 to 6, wherein the one axial end and the other axial end of the reinforcement ring have chamfered inner peripheral edges.

Effect of the Invention

According to the present invention, it is possible to provide the gasket capable of ensuring an excellent sealing property by the pair of seal beads oriented in the directions axially opposing to each other, regardless of the inserting direction of the gasket into the setting groove.

DETAILED DESCRIPTION OF THE INVENTIONS

In the following, preferred embodiments of a gasket according to the present invention will be described with reference to the drawings.

Figure 1:
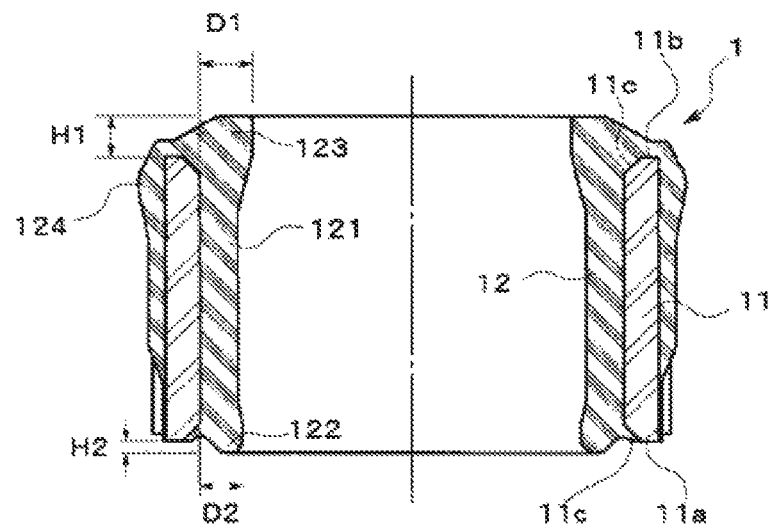
FIG. 1 is a vertical cross-sectional view illustrating a gasket according to the present invention.
Figure 2:
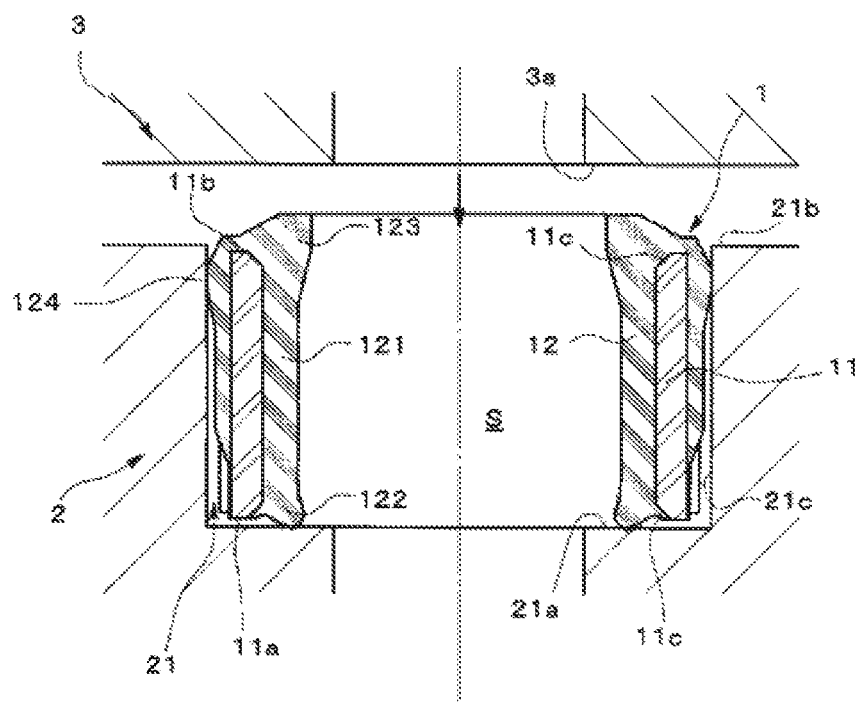
FIG. 2 is a vertical cross-sectional view illustrating a state immediately after the gasket illustrated in FIG. 1 is set inside a setting groove.
Figure 3:
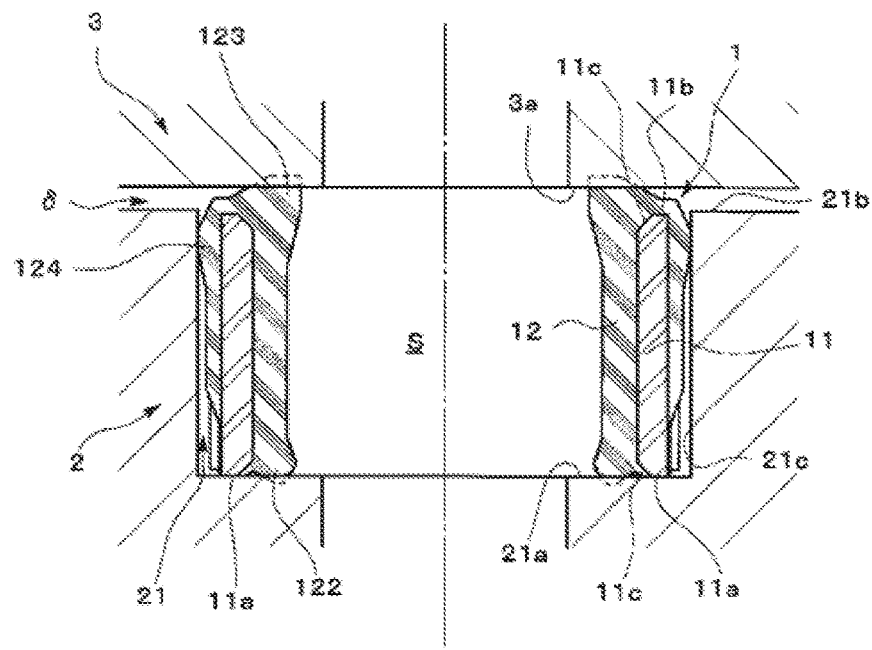
FIG. 3 is a vertical cross-sectional view illustrating a state in which the gasket illustrated in FIG. 1 is set inside the setting groove and axially compressed.

FIG. 1 is a vertical cross-sectional view illustrating a gasket according to the present invention, FIG. 2 is a vertical cross-sectional view illustrating a state immediately after the gasket illustrated in FIG. 1 is set inside a setting groove, and FIG. 3 is a vertical cross-sectional view illustrating a state in which the gasket illustrated in FIG. 1 is set inside the setting groove and axially compressed.

A gasket 1 is used as, for example, a sealing means or the like at a connecting portion between an automatic transmission (AT) case and a clutch case in the AT of an automobile, and has a structure in which a gasket body 12 is integrally molded with a reinforcement ring 11.

The reinforcement ring 11 is provided in order to impart strength to the gasket 1, and has a cylindrical shape formed of a suitable metal such as low carbon free-cutting steel. As illustrated in FIG. 3, a length in an axial direction (vertical direction in FIG. 1) of the reinforcement ring 11 is formed to have a length such that the other axial end 11b of the reinforcement ring 11 approaches an end surface 3a of the other mating member 3 in a state that one axial end 11a of the reinforcement ring 11 contacts an end surface 21a of a ring-shaped setting groove 21 formed on one mating member 2. More specifically, the length is formed such that the other axial end 11b of the reinforcement ring 11 is positioned at a same position as an opening edge 21b of the setting groove 21 or slightly lower than the opening edge 21b when the axial end 11a of the reinforcement ring 11 is in the state of contacting the end surface 21a of the setting groove 21.

The gasket body 12 is formed of a rubber-like elastic material (rubber material or synthetic resin material having rubber-like elasticity), and integrally molded with an inner peripheral surface and an outer peripheral surface of the reinforcement ring 11.

The gasket body 12 includes a base portion 121 embedded with the reinforcement ring 11, a first seal bead 122, and a second seal bead 123. The two seal beads 122, 123 are continuously formed with the base portion 121, positioned at both axial ends of the reinforcement ring 11, and oriented to the inner peripheral side in directions axially opposing to each other.

The base portion 121 of the gasket body 12 is molded from the inner peripheral surface to the outer peripheral surface of the reinforcement ring 11, striding over the other axial end 11b. Therefore, the other axial end 11b of the reinforcement ring 11 is covered by the thin gasket body 12. On the other hand, one axial end 11a of the reinforcement ring 11 projects from an outer peripheral portion of the first seal bead 122 and is not covered by the gasket body 12.

The first seal bead 122 is formed thinner and has a smaller volume compared to the second seal bead 123. Therefore, rigidity is lower than rigidity of the second seal bead 123. In other words, since the second seal bead 123 is formed thicker and has a larger volume compared to the first seal bead 122, the second seal bead 123 has higher rigidity than the seal bead 122 does. Therefore, when the gasket body 12 receives axial compression force, a deformation amount of the first seal bead 122 becomes larger than a deformation amount of the second seal bead 123.

In the state that the gasket 1 is not set in the setting groove 21, a projection amount D1 of the second seal bead 123 to the inner peripheral side of the reinforcement ring 11 is formed larger than a projection amount D2 of the first seal bead 122 to the inner peripheral side of the reinforcement ring 11 as illustrated in FIG. 1 (D1>D2). Meanwhile, the projection amount D1 corresponds to a width from the inner peripheral surface of the reinforcement ring 11 to an inner peripheral end of the second seal bead 123, and the projection amount D2 corresponds to a width from the inner peripheral surface of the reinforcement ring 11 to an inner peripheral end of the first seal bead 122.

Additionally, as for the projection amounts of the first and second seal beads 122, 123 from the reinforcement ring 11 in the directions axially opposing to each other, a projection amount H1 of the second seal bead 123 is formed larger than a projection amount H2 of the first seal bead 122 (H1>H2). Further, the projection amount H1 corresponds to a length from the other axial end 11*b* of the reinforcement ring 11 to an axial end portion of the second seal bead 123, and the projection amount H2 corresponds to a length from one axial end 11*a* of the reinforcement ring 11 to an axial end portion of the first seal bead 122.

While the details will be described later, in the second seal bead 123, the projection amounts D1 and H1 are set such that sufficient interference can be formed relative to the end surface 3*a* of the mating member 3 even in a state that the first seal bead 122 is completely crushed and the one axial end 11*a* of the reinforcement ring 11 comes to contact the end surface 21*a* of the setting groove 21.

By thus forming the projection amounts D1, D2, H1, H2 of the first and second seal beads 122, 123, a rigidity difference can be easily provided between the first and second seal beads 122, 123.

The gasket body 12 includes, on the outer peripheral surface of the base portion 121, an outer peripheral bead 124 having a gentle chevron-shaped cross-section formed in a bulging manner. The gasket 1 is formed such that an outer diameter at a top portion of the outer peripheral bead 124 becomes slightly larger than an inner diameter of the setting groove 21. With this structure, close-contact sealing with the inner peripheral surface 21*c* of the setting groove 21 can be achieved also on the outer peripheral side of the gasket 1, and further concentricity of the gasket 1 relative to the setting groove 21 can be ensured. Therefore, this structure is preferable in the present invention.

Next, functions when the gasket 1 is set inside the setting groove 21 will be described.

As illustrated in FIG. 2, the gasket 1 is disposed by being inserted into the ring-shaped setting groove 21 formed on the one mating member 2. FIGS. 2 and 3 illustrate a state in which the gasket 1 is inserted such that the first seal bead 122 side is located on the end surface 21*a* side of the setting groove 21.

When the gasket 1 is inserted into the setting groove 21 and the mating members 2, 3 are fastened with bolts or the like not illustrated, the gasket 1 is pushed by the mating member 3 and the first and second seal beads 122, 123 receive axial compression force. At this point, the first seal bead 122 is preferentially deformed and falls toward the inner peripheral side because the first seal bead 122 has low rigidity and is easily deformed while the second seal bead 123 is thick and has the large volume and high rigidity. As a result, the gasket 1 is set inside the setting groove 21 in a manner eccentrically located on the first seal bead 122 side, more specifically, on the end surface 21*a* side of the setting groove 21.

Further, preferably, a tip of the first seal bead 122 is formed to have a round curved surface as illustrated. The reason is that the first seal bead 122 can smoothly fall toward the inner peripheral side at the time of setting the gasket.

While the gasket 1 is set, the gasket 1 is in a state that the one axial end 11*a* of the reinforcement ring 11 contacts the end surface 21*a* of the setting groove 21 or is located close to the end surface 21*a* as illustrated in FIG. 3. This stops the first seal bead 122 from falling toward the inner peripheral side any further. Additionally, the outer peripheral bead 124 closely contacts an inner peripheral surface 21*c* of the setting groove 21 in a state of being radially compressed.

After that, when fastening of the mating members 2, 3 is completed, axial compression force is absorbed by the second seal bead 123 that falls toward the inner peripheral side or is compressed (as indicated by solid lines in FIG. 3).

The reason is that the second seal bead 123 has sufficient interference (indicated by dotted lines in FIG. 3) relative to the end surface 3*a* of the mating member 3 even in the state that the first seal bead 122 is completely crushed and the one axial end 11*a* of the reinforcement ring 11 contacts the end surface 21*a* of the setting groove 21. With this structure, the first seal bead 122 closely contacts the end surface 21*a* of the setting groove 21, and the second seal bead 123 closely contacts the end surface 3*a* of the mating member 3, thereby the gasket 1 achieving to seal the sealing target space S.

In the case where the first and second seal beads 122, 123 receive high fluid pressure from the inner peripheral side of the gasket 1 in this setting state, the fluid pressure is respectively applied. At this point, since the low-rigid first seal bead 122 is backed up from the outer peripheral side by the one axial end 11*a* of the reinforcement ring 11 that contacts or is positioned close to the end surface 21*a* of the setting groove 21, the deformation amount to the outer peripheral side is suppressed and protrusion toward the outer peripheral side is prevented, thereby ensuring an excellent sealing property.

Further, the gasket 1 is pushed against the end surface 21*a* of the setting groove 21 by the fluid force applied to the first seal bead 122. However, since the gasket 1 in the setting state is eccentrically located on the end surface 21*a* side of the setting groove 21 and the one axial end 11*a* of the reinforcement ring 11 contacts the end surface 21*a* to stop further movement, the position of the gasket 1 is little changed in the axial direction. Therefore, even when the fluid pressure is repeatedly turned on and off, there is no possibility that abrasion and the like is caused by repeated axial movement of the gasket 1 with a large stroke.

In the case where the outer peripheral bead 124 is provided as illustrated in the present embodiment, the outer peripheral bead 124 closely contacts the inner peripheral surface 21*c* of the setting groove 21. Therefore, an effect of improving an effect of suppressing axial displacement of the gasket 1 can be also obtained. As a result, abrasion of the first and second seal beads 122, 123 and the outer peripheral bead 124 can be effectively suppressed.

On the other hand, when the relatively high-rigid second seal bead 123 receives the fluid pressure, deforming force toward the outer peripheral side acts on the second seal bead 123, but since the second seal bead 123 is thicker, has the larger volume than the first seal bead 122 and closely contacts the end surface 3*a* of the mating member 3 with the sufficient interference, the second seal bead 123 does not largely fall toward the outer peripheral side. Therefore, the second seal bead 123 contacts the end surface 3*a* more closely, and can improve the sealing property. As a result, the gasket 1 exerts the excellent sealing property in the second seal bead 123 as well.

Further, since the other axial end 11*b* of the reinforcement ring 11 is disposed inside the gasket body 12 in the vicinity of the second seal bead 123, the other axial end 11*b* of the reinforcement ring 11 functions so as to prevent the second seal bead 123 from falling toward the outer peripheral side. Therefore, the second seal bead 123 is prevented from protruding to the clearance δ.

Meanwhile, the outer peripheral bead 124 illustrated in the present embodiment is disposed on the outer peripheral surface of the gasket body 12 in the vicinity of the other axial end 11*b* of the reinforcement ring 11. With this structure, even when the deforming force to the inner peripheral surface 21*c* of the setting groove 21 acts on the other axial end 11*b* of the reinforcement ring 11 and the second seal bead 123 due to the fluid force, the outer peripheral bead 124 receives this force, and the second seal bead 123 can be effectively prevented from deforming to the outer peripheral side. Therefore, the structure is the preferable embodiment in the present invention. This can further improve the effect of preventing the second seal bead 123 from protruding toward the clearance δ.

Preferably, chamfered portions 11c are formed at inner peripheral edges of both ends of the reinforcement ring 11 as illustrated. With this structure, when the deforming force to the outer peripheral side acts on the first and second seal beads 122, 123 due to the fluid pressure, it is possible to prevent occurrence of adhesion peeling and cracking caused by stress concentrated in areas adjacent to both ends of the reinforcement ring 11.

Figure 4:
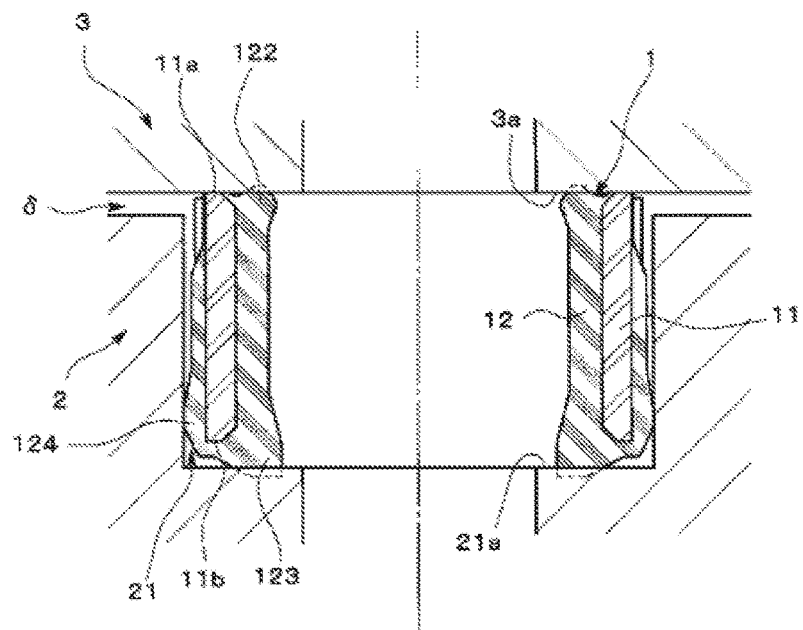
FIG. 4 is a vertical cross-sectional view illustrating a state in which the gasket illustrated in FIG. 1 is set in a direction opposite to the set state illustrated in FIGS. 2 and 3.
Figure 5:
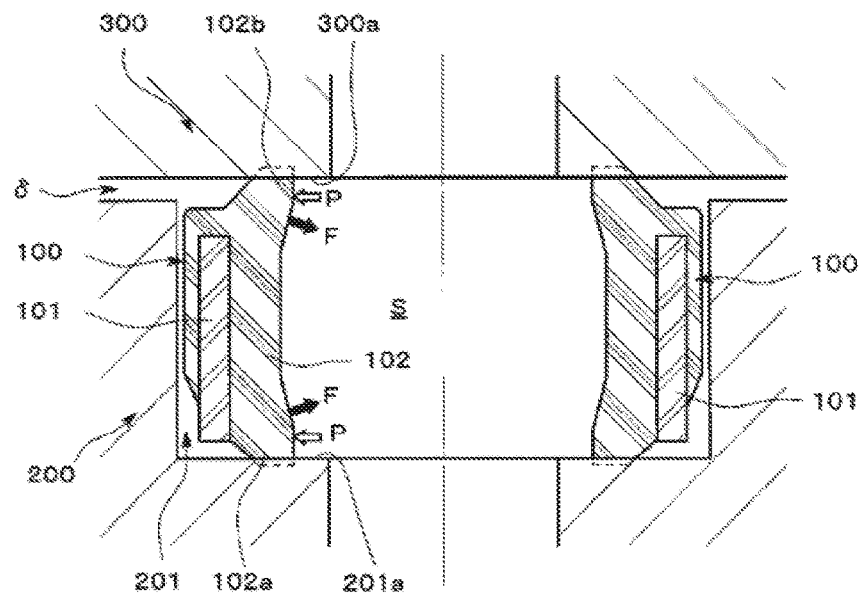
FIG. 5 is a vertical cross-sectional view illustrating a state in which a gasket in the related art is set.
Figure 6:
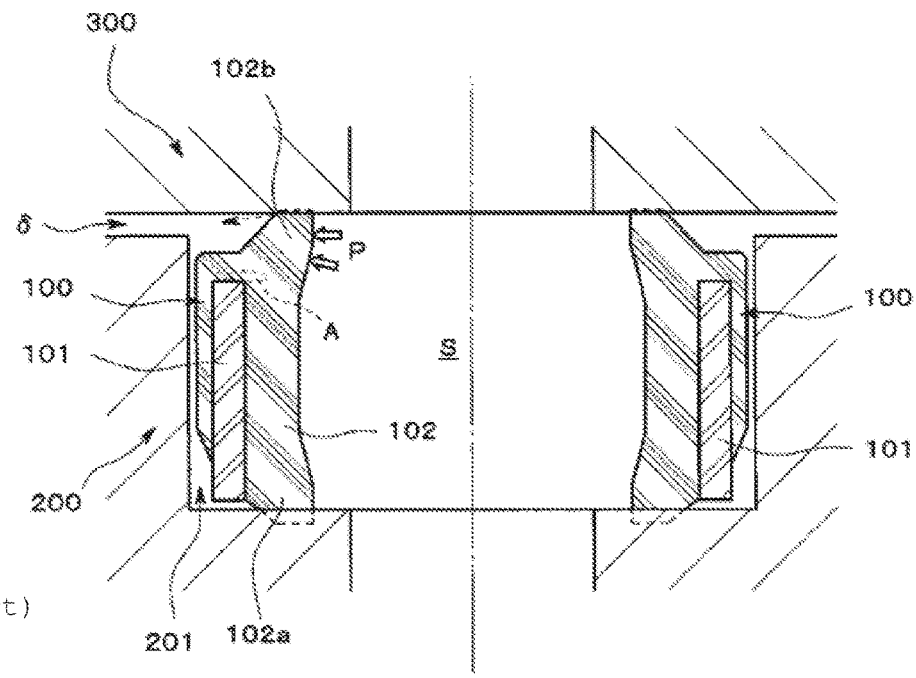
FIG. 6 is a vertical cross-sectional view illustrating a state in which pressure is applied to the inside of an internal sealing space after the gasket in the related art is set.

The above-described gasket 1 is inserted into the setting groove 21 such that the first seal bead 122 side is located on the end surface 21a side of the setting groove 21, but the inserting direction of the gasket 1 into the setting groove 21 is not limited at all. Therefore, as illustrated in FIG. 4, the gasket 1 may also be set in an opposite direction of FIGS. 2 and 3. More specifically, as illustrated in FIG. 4, the gasket 1 may be set such that the relatively high-rigid second seal bead 123 closely contacts the end surface 21a of the setting groove 21 and the low-rigid first seal bead 122 closely contacts the end surface 3a of the mating member 3. This structure also provides an effect of exerting the excellent sealing property same as above.

Therefore, the gasket 1 can ensure the excellent sealing property by the first and second seal beads 122, 123, regardless of the inserting direction into the setting groove 21.

In this case, the clearance δ between the mating members 2, 3 is located on the outer peripheral side of the low-rigid first seal bead 122. However, when the relatively low-rigid first seal bead 122 is crushed, the position of the gasket 1 after being set is eccentrically located on the mating member 3 side inside the setting groove 21. Therefore, the one axial end 11a of the reinforcement ring 11 is disposed so as to block the clearance δ from the inner peripheral side. This structure can effectively prevent the first seal bead 122 from protruding toward the clearance δ due to the fluid pressure.

Therefore, according to the gasket 1 of the present invention, the first and second seal beads 122, 123 are prevented from protruding toward the clearance δ between the mating members 2, 3, regardless of the inserting direction of the gasket 1, and liquid leakage from the clearance δ can be surely prevented. As a result, there is no need to pay close attention to the inserting direction at the time of setting the gasket 1, and workability is highly improved as well.

| EXPLANATION OF LETTERS OR NUMERALS | | |
|---|---|---|
| 1 | Gasket | |
| 11 | Reinforcement ring | |
| | 11a | One axial end |
| | 11b | The other axial end |
| | 11c | Chamfered portion |
| 12 | Gasket body | |
| | 121 | Base portion |
| | 122 | First seal bead |
| | 123 | Second seal bead |
| | 124 | Outer peripheral bead |
| 2, 3 | Mating member | |
| | 3a | End surface |
| 21 | Setting groove | |
| | 21a | End surface |
| | 21b | Opening edge |
| | 21c | Inner peripheral surface |

-continued

| EXPLANATION OF LETTERS OR NUMERALS | |
|---|---|
| S | Sealing target space |
| δ | Clearance |

I claim:

1. A gasket having a gasket body integrally molded with a reinforcement ring,
   the gasket body including first and second seal beads positioned at one axial end and the other axial end of the reinforcement ring and oriented to an inner peripheral side in one axial direction of the reinforcement ring and the other axial direction of the reinforcement ring, and
   one of the first and second seal beads closely contacting an end surface of a setting groove formed on one mating member, and the other one of the first and second seal beads closely contacting an end surface of the other mating member,
   wherein an axial length of the reinforcement ring is formed to have a length defined by a first axial end and a second axial end such that the second axial end of the reinforcement ring is positioned at a same position as an opening edge of the setting groove in a state that the first axial end of the reinforcement ring contacts the end surface of the setting groove,
   one axial end of the reinforcement ring projects, in the axial direction of the reinforcement ring, at an outer peripheral side of the first seal bead,
   the first seal bead has rigidity lower than rigidity of the second seal bead,
   the second seal bead is formed with interference relative to the end surface of the other mating member or the end surface of the setting groove in a state that one axial end of the reinforcement ring contacts the end surface of the setting groove or an end surface of the other mating member, and
   the first and second seal beads are set being backed up by the reinforcement ring in a state that the first axial end of the reinforcement ring is eccentrically placed on the first seal bead side in the setting groove.

2. The gasket according to claim 1, wherein when the gasket is not set in the setting groove yet, a projection amount of the second seal bead toward an inner peripheral side of the reinforcement ring and a projection amount of the second seal bead in the axial direction of the reinforcement ring are formed larger than a projection amount of the first seal bead toward the inner peripheral side of the reinforcement ring and a projection amount of the first seal bead in the axial direction of the reinforcement ring, respectively.

3. The gasket according to claim 1, wherein a deformation amount of the first seal bead is larger than a deformation amount of the second seal bead when the gasket body receives axial compression force.

4. The gasket according to claim 1 wherein an outer peripheral bead closely contacting an inner peripheral surface of the setting groove is formed on an outer peripheral surface of the gasket body, and the outer peripheral bead is set being backed up by the reinforcement ring when being set into the setting groove.

5. The gasket according to claim 4, wherein the outer peripheral bead is formed on the outer peripheral surface of the gasket body in the vicinity of the other axial end of the reinforcement ring.

6. The gasket according to claim 1, wherein the first seal bead has a round-shaped tip.

7. The gasket according to claim 1, wherein the one axial end and the other axial end of the reinforcement ring have chamfered inner peripheral edges.

8. The gasket according to claim 1, wherein the first seal bead has a round curved surface at one axial end.

* * * * *